UNITED STATES PATENT OFFICE.

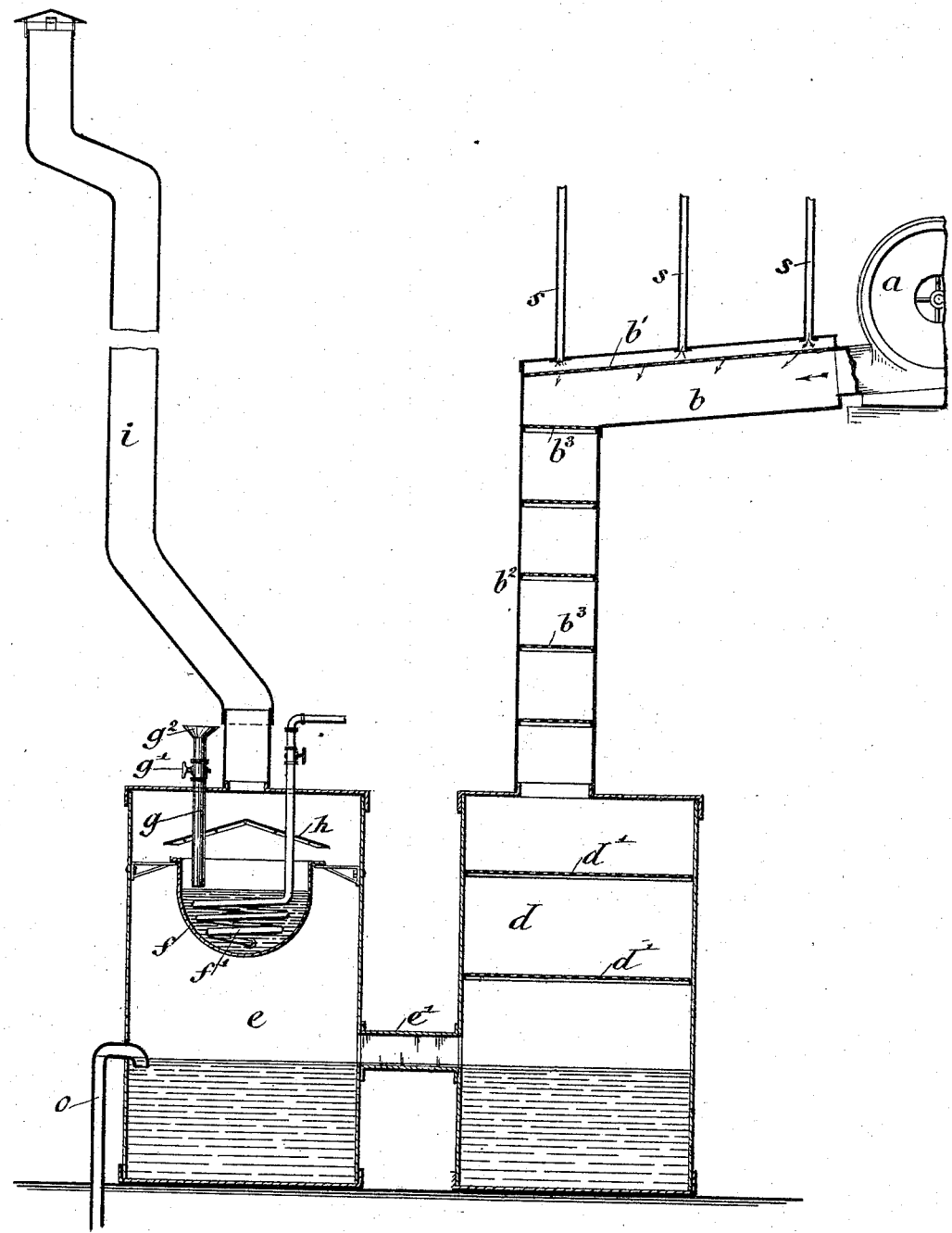

WILLIAM MOACKLER, OF NEW YORK, N. Y., ASSIGNOR TO FERDINAND SULZBERGER, OF SAME PLACE.

DISINFECTING APPARATUS.

SPECIFICATION forming part of Letters Patent No. 526,252, dated September 18, 1894.

Application filed May 16, 1894. Serial No. 511,411. (No model.)

*To all whom it may concern:*

Be it known that I, WILLIAM MOACKLER, a citizen of the United States, residing in the city, county, and State of New York, have invented certain new and useful Improvements in Apparatus for Destroying Noxious Vapors, of which the following is a specification.

The invention consists of an apparatus for destroying noxious vapors, which comprises a suction-fan, a series of superposed screens, means for supplying water to said screens, a water-collecting tank, a second tank communicating with the latter, a kettle for deodorizing the vapors in the second tank, and means for conducting the deodorized vapors to the atmosphere.

The accompanying drawing represents a vertical central section of my improved apparatus for destroying noxious vapors.

Referring to the drawing, $a$ is a suction-fan, which is located in the chamber from which the noxious vapors are to be drawn off. This may be a building in which fat is rendered, a slaughter-house, soap-factory or any other space, in which noxious vapors are generated. The suction-fan $a$ draws in the vapors and forces the same into a downwardly-inclined tube $b$ at the upper part of which is arranged a perforated distributing diaphragm $b'$, above which and communicating therewith a number of water supply-pipes $s$, $s$, are arranged. By means of the perforated diaphragm $b'$ the water is dropped in fine sprays through the vapors, passing then along the lower part of the inclined tube $b$ to a vertical tube $b^2$, which is provided with a number of horizontal perforated shelves or screens $b^3$, through which the vapors are forced, together with the water which is delivered in fine sprays from one shelf to the other. The vertical tube $b^2$ communicates with a larger tank or scrubber $d$, which is provided with several horizontal superposed screens or perforated shelves $d'$, and in the lower part of which the washing or scrubbing water is collected. The scrubbing tank $d$ connects by a horizontal pipe $e'$ with a second tank $e$, the water collecting in the scrubbing tank $d$ slightly above the level of the lower part of the pipe $e'$, so as to pass to the tank $e$ on the same level. The tank $e$ is provided with a waste-pipe $o$ for carrying off the overflow. In the second or deodorizing tank $e$ is arranged a kettle $f$, into which pine-tar or other material is placed. A steam-coil $f'$ in said tank serves to heat up the pine-tar and produce the gradual evaporation of the same, so that it passes in the form of vapors into the tank $e$. A hood $h$ is arranged at some distance above the kettle $f$, so that the vapors are compelled to pass between the rim of the tank and the hood into the lower part of the tank $e$. A pipe $g$ provided with a stop-cock $g'$ and a funnel $g^2$ at its upper end, leads from the outside of the deodorizing tank $e$ into the kettle $f$, so as to re-supply the kettle with pine-tar, or other deodorizing material, from time to time. From the top of the deodorizing tank $e$ extends a flue $i$ through the building to some distance above the roof, so that the vapors in the tank $e$ can pass off through the flue $i$ to the atmosphere.

The operation of my apparatus is as follows: The fan being set in motion, all the gases and vapors which are generated in the space to be ventilated are drawn in by the fan and forced through the inclined tube $b$, so as to pass through the sprays of water, and then through the series of superposed shelves $b^3$, $d'$, into the scrubbing-tank $d$. The vapors are washed in their passage through the different perforated shelves or screens, so that the impurities which are condensible in water are absorbed by the same and collected with the water in the bottom of the scrubbing-tank, and conducted from the same through the connecting pipe $e'$ to the lower part of the deodorizing-tank, and thence to the river or sewer. The vapors are forced through the connecting-pipe $e'$ into the deodorizing-tank $e$, and there mingled with the vapors of pitch, tar or other deodorizing vapors, and then forced into the uptake flue $i$ and discharged with the deodorizing vapors to the atmosphere. Owing to the continuous generation of vapors, a new quantity of these deodorizing vapors is continually mixed with the washed or scrubbed vapors drawn off from the space to be ventilated. The deodorizing vapors being compelled to pass in downward direction in the deodorizing-tank exert a very effective deodorizing action on the vapors, so as to remove the disagreeable and offensive odor of the same, and discharge the vapors to the atmosphere without being objectionable to those living in the neighborhood.

My improved apparatus is comparatively inexpensive, one or more being connected with the space to be ventilated, according to the size of the same. The vapors are thoroughly washed, condensed and deodorized, so that a more effective disposition of the noxious vapors is made than by the various scrubbers and condensers heretofore in use for that purpose.

Having thus described my invention, I claim as new and desire to secure by Letters Patent—

1. The combination of a suction-fan communicating with a space to be ventilated, a tube leading therefrom and provided with a series of superposed perforated screens, means for discharging water onto said screens, a scrubbing-tank communicating with said tube, a deodorizing-tank connected with the scrubbing-tank, a kettle for containing a deodorizing liquid and adapted to supply the fumes of said liquid into the deodorizing tank, means for heating the kettle, and an uptake flue connecting the top of the deodorizing-tank with the atmosphere, substantially as set forth.

2. The combination of a suction-fan communicating with a space to be ventilated, an inclined tube connecting with the discharge-opening of the fan casing, pipes for supplying water to the inclined tube, a perforated distributing diaphragm below the said pipes, an upright tube leading from the inclined tube, a series of superposed perforated screens arranged vertically below each other within the upright tube, a scrubbing-tank having perforated screens communicating with the vertical tube, a deodorizing-tank, a pipe connecting the scrubbing-tank with the deodorizing tank, a kettle in said deodorizing tank, means for heating the contents of the kettle, a hood above said kettle, and an uptake-flue connecting the top of the deodorizing-tank with the atmosphere, substantially as set forth.

3. The combination of a deodorizing-tank provided with a waste-pipe, a kettle in said tank, means for heating the contents of said kettle, a hood extending above the kettle, a valved pipe provided with a funnel and terminating in the kettle for supplying the deodorizing liquid, and an uptake-flue connected with the top of the deodorizing tank, substantially as set forth.

In testimony that I claim the foregoing as my invention I have signed my name in presence of two subscribing witnesses.

WILLIAM MOACKLER.

Witnesses:
PAUL GOEPEL,
K. R. BRENNAN.